US012632654B2

(12) United States Patent
Neumann

(10) Patent No.: US 12,632,654 B2
(45) Date of Patent: *May 19, 2026

(54) SYSTEMS AND METHODS FOR CLASSIFICATION OF TEXTUAL WORKS

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC, Lakewood, CO (US)

( * ) Notice: Subject to any disclaimer, the term of this patent is extended or adjusted under 35 U.S.C. 154(b) by 289 days.

This patent is subject to a terminal disclaimer.

(21) Appl. No.: 18/133,270

(22) Filed: Apr. 11, 2023

(65) Prior Publication Data

US 2023/0244869 A1 Aug. 3, 2023

Related U.S. Application Data

(63) Continuation-in-part of application No. 17/690,176, filed on Mar. 9, 2022, now Pat. No. 11,625,935, which is a continuation of application No. 16/912,126, filed on Jun. 25, 2020, now Pat. No. 11,275,936.

(51) Int. Cl.
| | |
|---|---|
| *G06F 40/284* | (2020.01) |
| *G06F 18/214* | (2023.01) |
| *G06V 30/414* | (2022.01) |
| *G06V 30/416* | (2022.01) |
| *G06V 30/418* | (2022.01) |

(52) U.S. Cl.
CPC .......... *G06F 40/284* (2020.01); *G06F 18/214* (2023.01); *G06V 30/414* (2022.01); *G06V 30/416* (2022.01); *G06V 30/418* (2022.01)

(58) Field of Classification Search
CPC ... G06F 18/214; G06F 40/284; G06V 30/414; G06V 30/416; G06V 30/418
See application file for complete search history.

(56) References Cited

U.S. PATENT DOCUMENTS

| | | | |
|---|---|---|---|
| 6,802,810 | B2 | 10/2004 | Ciarniello et al. |
| 8,594,948 | B2 | 11/2013 | Mcglennen et al. |
| 8,655,817 | B2 | 2/2014 | Hasey et al. |
| 8,812,244 | B2 | 8/2014 | Angelides |
| 9,092,391 | B2 | 7/2015 | Stephan et al. |
| 10,152,702 | B2 | 12/2018 | Ingber |
| 10,628,476 | B2 * | 4/2020 | Sohma .................. G06F 16/358 |
| 10,839,013 | B1 | 11/2020 | Werris |

(Continued)

OTHER PUBLICATIONS

Chui, et al., Disease Diagnosis in Smart Healthcare: Innovation, Technologies and Applications, journal, Dec. 18, 2017, vol. 9, issue 12.

*Primary Examiner* — Daniel G Mariam
(74) *Attorney, Agent, or Firm* — Caldwell LLC

(57) ABSTRACT

A system for classification of textual works includes a computing device configured to receive a first scholastic work, identify an author and a category of the first scholastic work, determine at least a work theme, calculate a reliability quantifier as a function of the at least a theme, the author, and the category, select the scholastic work as a function of the reliability quantifier, and derive, from the scholastic work, at least a correlation between a dietary practice and alleviation of a disease state.

20 Claims, 9 Drawing Sheets

(56) References Cited

U.S. PATENT DOCUMENTS

| | | | |
|---|---|---|---|
| 2005/0075543 | A1 | 4/2005 | Calabrese |
| 2008/0059224 | A1 | 3/2008 | Schechter |
| 2014/0162887 | A1 | 6/2014 | Martin et al. |
| 2015/0019241 | A1 | 1/2015 | Bennett et al. |
| 2015/0177250 | A1 | 6/2015 | Leontovich et al. |
| 2017/0236281 | A1 | 8/2017 | Dacosta |
| 2018/0365383 | A1 | 12/2018 | Bates |
| 2019/0088366 | A1 | 3/2019 | Vaughan et al. |

* cited by examiner

SYSTEMS AND METHODS FOR CLASSIFICATION OF TEXTUAL WORKS

CROSS-REFERENCE TO RELATED APPLICATIONS

This application is a continuation-in-part of Non-provisional application Ser. No. 17/690,176, filed on Mar. 9, 2022, and entitled "SYSTEMS AND METHODS FOR CLASSIFICATION OF SCHOLASTIC WORKS," which is a continuation of Non-provisional application Ser. No. 16/912,126 filed on Jun. 25, 2020 and entitled "SYSTEMS AND METHODS FOR CLASSIFICATION OF SCHOLASTIC WORKS," the entirety of each of which is incorporated herein by reference.

FIELD OF THE INVENTION

The present invention generally relates to the field of language processing. In particular, the present invention is directed to systems and methods for classification of textual works.

BACKGROUND

A wealth of data exists in the form of scientific and/or medical research that has the potential as training data to generate classifiers or other models suitable for diagnostic or other procedures. Unfortunately, much of this data is not in a useful form for efficient analysis, placing it beyond the reach of existing solutions.

SUMMARY OF THE DISCLOSURE

In an aspect, a system for classification of textual works is described. The system includes a computing device, wherein the computing device is configured to receive a first textual work including a plurality of textual elements. The computing device is further configured to identify an author and a category of the first textual work. The computing device is further configured to determine at least a work theme using a theme classifier as a function of the plurality of textual elements. The computing device is further configured to calculate a reliability quantifier as a function of the at least a work theme, the author, and the category. The computing device is further configured to select the textual work as a function of the reliability quantifier. The computing device is further configured to derive, from the textual work, at least a correlation between a dietary practice and alleviation of a disease state.

In another aspect, a method for classification of textual works is described. The method includes receiving, by a computing device, a first textual work including a plurality of textual elements. The method further including identifying, by the computing device, an author and a category of the first textual work. The method further including determining, by the computing device, at least a work theme using a theme classifier as a function of the plurality of textual elements. The method further including calculating, by the computing device, a reliability quantifier as a function of the at least a work theme, the author, and the category. The method further including selecting, by the computing device, the textual work as a function of the reliability quantifier. The method further including deriving, by the computing device from the scholastic work, at least a correlation between a dietary practice and alleviation of a disease state.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein analyze textual works to determine fields of applicability as well as reliability of such works. Correlations may be derived from textual works 108 for use in training data and/or other applications in machine learning, and/or for storage in expert databases suitable for use in various applications. In some embodiments, systems and methods described herein may generate further training data for iterative learning, powering increasingly accurate processes for producing increasingly good quality of derived data. System may further use unfavorable scholarship and/or retractions to detect situations where a give scholastic work should not be used in further training, and may remove such a work from storage underlying training data; this may further increase the ability to train expert systems or other machine-learning and/or database driven platforms in a manner that accounts for the evolving nature of knowledge as encapsulated in such works.

Figure 1:
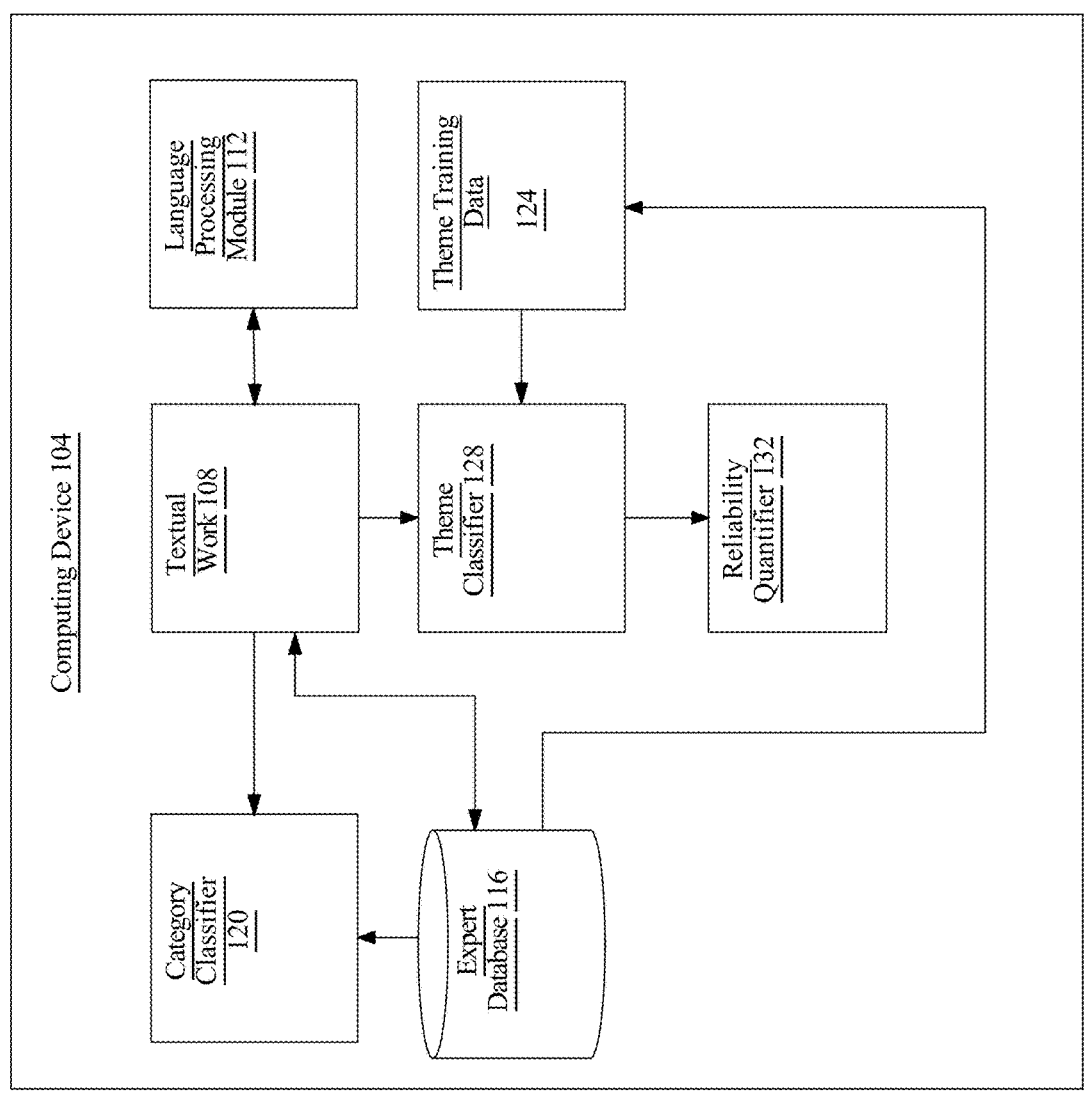
FIG. 1 is a block diagram illustrating an exemplary embodiment of a system for classification of textual works.

Referring now to FIG. 1, an exemplary embodiment of a system 100 for classification of textual works 108 is illustrated. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive a first textual work 108 including a plurality of textual elements. A "textual work," for the purposes of this disclosure, is a document, article, and/or other body of text comprising primarily text. In some embodiments, textual work 108 may include a scholastic work. A "scholastic work," as used in this disclosure, is a document, article, and/or other body of text containing results of scientific and/or medical analysis and/or study. A scholastic work may include, without limitation, a peer-reviewed scientific and/or medical journal article, a non-peer reviewed journal article, a transcript and/or other description of proceedings at an academic, scientific, and/or medical conference, an article in a popular science magazine, a case study as published in a medical and/or scientific journal, a website entry penned by a scientist, clinician, or other expert author, or the like. As non-limiting examples, textual work 108 may include blog posts, social media posts, news reports, and the like.

With continued reference to FIG. 1, textual work 108, as non-limiting examples, may include newspaper articles, blog posts, doctors notes, testimonials. In some embodiments, textual work 108 may include textual data scraped from the internet. In some embodiments, textual work 108 may be acquired using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape textual work 108 from a plurality forums, medical blogs, medical news sites, social medial sites, and the like. The web crawler may be seeded and/or trained with a reputable web site, such as webMD.com, to begin the search. A web crawler may be generated by a computing device 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to user data statistics from and correlate to pecuniary user data, educational user data, social user data, and the like. Additionally, the web crawler function may be configured to search for and/or detect one or more data patterns. A "data pattern" as used in this disclosure is any repeating forms of information. A data pattern may include repeating pecuniary strategies, educational strategies, and the like. In some embodiments, the web crawler may be configured to determine the relevancy of a data pattern. Relevancy may be determined by a relevancy score. A relevancy score may be automatically generated by computing device 104, received from a machine learning model, and/or received from the user. In some embodiments, a relevancy score may include a range of numerical values that may correspond to a relevancy strength of data received from a web crawler function. As a non-limiting example, a web crawler function may search the Internet for textual work 108 related to an external user.

Continuing to refer to FIG. 1, computing device 104 may receive first textual work 108 in any suitable manner. Receiving may include receiving an entry of a file containing first textual work 108 by a user, who may be an expert user; user may download file from a service such as JSTOR as provided by Ithaka Harbors, Inc. of New York and/or from an online version of a journal. Alternatively or additionally, user may provide textual work 108 from a portable memory device and/or another device connected to computing device 104 directly and/or by means of any wired or wireless network connection. As a further non-limiting example, receiving may include receiving in an electronic communication such as a feed or subscription service, by crawling and/or scraping Internet sites, or the like. Textual work 108 may be entered into computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, computing device 104 may automatically obtain the document using such an identifier, for instance by submitting a request to a database or compendium of documents such as JSTOR as provided by Ithaka Harbors, Inc. of New York.

Further referring to FIG. 1, computing device 104 may parse textual work 108 for a plurality of phrases. Parsing and/or other processes for extraction of phrases and/or textual elements may be performed, without limitation, by a language processing module 112. Language processing module 112 may include any hardware and/or software module. Language processing module 112 may be configured to extract, from the one or more documents, one or more words, phrases, sentences, paragraphs, and/or other textual elements. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may compare extracted textual elements to one or more associated textual elements and/or to associations therewith, in a corpus of documents. In an embodiment, such associations may be enumerated, to find total count of mentions in such documents. Alternatively or additionally, language processing module may operate to produce a language processing model. Language processing model may include a program automatically generated by computing device 104 and/or language processing module to produce associations between one or more words extracted from at least a document and detect associations, including without limitation mathematical associations, between such textual elements. Associations between language elements, where language elements include for purposes herein extracted words or other textual elements may include, without limitation, mathematical associations, including without limitation statistical correlations between any language element and any other language element and/or language elements. Statistical correlations and/or mathematical associations may include probabilistic formulas or relationships indicating, for instance, a likelihood that a given detected and/or extracted textual element indicates another textual element. As a further example, statistical correlations and/or mathematical associations may include probabilistic formulas or relationships indicating a positive and/or negative association between at least an extracted word and other textual elements.

Further referring to FIG. 1, language processing module and/or computing device 104 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HAIM). HMMs as used herein are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a nonlimiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Further referring to FIG. 1, language processing module may include a module generated per publication and/or per subject area, where publications, and thus textual works 108 within such publications may be classified to subject areas. For instance, and without limitation, when a publication is encountered for the first time, a non-subject-specific language model may be used extract words, phrases, and/or textual works 108 from issues of the publication; publication may be classified to one or more themes as described below which may include and/or be used to inform classification to subject areas. An language processing module developed and/or trained from such subject areas may be used thereafter to parse and/or otherwise process and/or analyze language from publication as classified, which classification may be stored in memory of computing device 104, using a subject-area language model for a subject area to which publication has been classified. Computing device 104 and/ or other devices in and/or communicating with system 100 may periodically update and/or training any language processing module using any language processing methods and/or protocols as described above.

Still referring to FIG. 1, computing device 104 and/or language processing module may be configured to identify sections of textual work 108. Sections of textual work 108 may include, without limitation, an abstract, a conclusion, a discussion section, an analysis section, an appendix, a bibliography, and/or any other distinct section of any textual work 108 as described above. Identifications of sections may be performed by identifications of headings containing words associated with such sections, such as "Abstract," "Discussion," "Appendix I," or the like. Alternatively or additionally language processing module may detect textual elements such as words, phrases, sentences, and/or paragraphs having a high degree of vector similarity and/or other close association with such sections; this may enable computing device 104 and/or language processing module to detect a section in circumstances in which the section does not contain a particular keyword ordinarily associated therewith, and/or in which it is not feasible to distinguish section headings from other text.

With continued reference to FIG. 1, computing device 104 is configured to identify at least an author of textual work 108. In an embodiment, each author of textual work 108 may be identified in an "authors" section and/or by one or more words indicative of authorship such as "by" at a section of textual work 108 such as a title page, footer, or the like. Authors may be separately identified by a database such as JSTOR. Authors may be identified in metadata. Authors may be entered manually by a user uploading and/or transmitting textual work 108 to computing device 104. Persons skilled in the art, upon reviewing the entirety of this disclosure, will be aware of various alternative or additional ways in which authors may be identified by computing device 104, consistently with this disclosure.

Further referring to FIG. 1, computing device 104 may be configured to identify a category of textual work 108. A "category" of a textual work 108, as used in this disclosure, is a kind of article and/or document indicating its role in scientific and/or medical research, such as is suitable, for instance, to distinguish peer-reviewed work from expository and/or speculative work. A category may include, without limitation, a peer-reviewed journal article, a non-peer reviewed journal article, a journal article that has review pending, a non-journal scientific article, a popular science article, a news article, a webpage, or the like. Each category may be broken into further sub-categories such as without limitation a recommendation, a case study, a proposed treatment, diagnostic data, research results, or the like. In an embodiment, text in and/or associated with textual work 108 may indicate a category thereof; for instance, in a peer-reviewed journal, a given work may be identified as a peer-reviewed by a heading indicating it is an "article," while another category such as proceedings of a conference, a review, an editorial commentary, or the like may be so denoted as well. As a further non-limiting example, where textual work 108 is provided by a subscription service, database, and/or expert user, such subscription service, database, and/or expert user may indicate a category to which textual work 108 does and/or does not belong, such as differentiating between peer-reviewed work and non-peer-reviewed work, distinguishing between various forms of the latter, or the like. Publications may further indicate and/or be associated with indications in databases, including an expert database as described in further detail below, identifying such publications as peer-reviewed, non-peer reviewed, or the like. In some situations, computing device 104 may identify category using keyword matching.

Alternatively or additionally, and still referring to FIG. 1, for instance where keyword matching is inconclusive, and/or where keyword matching has been identified by reviewing users as inaccurate or unreliable, identifying category may include receiving category training data, the category training data including a plurality of entries, each entry including at least a portion of a work and a correlated category. "Training data," as used in this disclosure, is data containing correlations that a machine-learning and/or classification process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and further referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure. As a non-limiting illustrative example, theme training data 124 may include a plurality of entries including at least a portion of a work and a correlated category. "At least a portion" of a work may include any section, paragraph, keyword, or other textual element as described above.

Still referring to FIG. 1, training data may be retrieved, without limitation, from an expert database. Expert database may be implemented, without limitation, as a relational database, a key-value retrieval database such as a NOSQL database, or any other format or structure for use as a database that a person skilled in the art would recognize as suitable upon review of the entirety of this disclosure. Expert database may alternatively or additionally be implemented using a distributed data storage protocol and/or data structure, such as a distributed hash table or the like. Expert database may include a plurality of data entries and/or records as described above. Data entries in an expert database may be flagged with or linked to one or more additional elements of information, which may be reflected in data entry cells and/or in linked tables such as tables related by one or more indices in a relational expert database. Persons skilled in the art, upon reviewing the entirety of this disclosure, will be aware of various ways in which data entries in an expert database may store, retrieve, organize, and/or reflect data and/or records as used herein, as well as categories and/or populations of data consistently with this disclosure.

Figure 2:
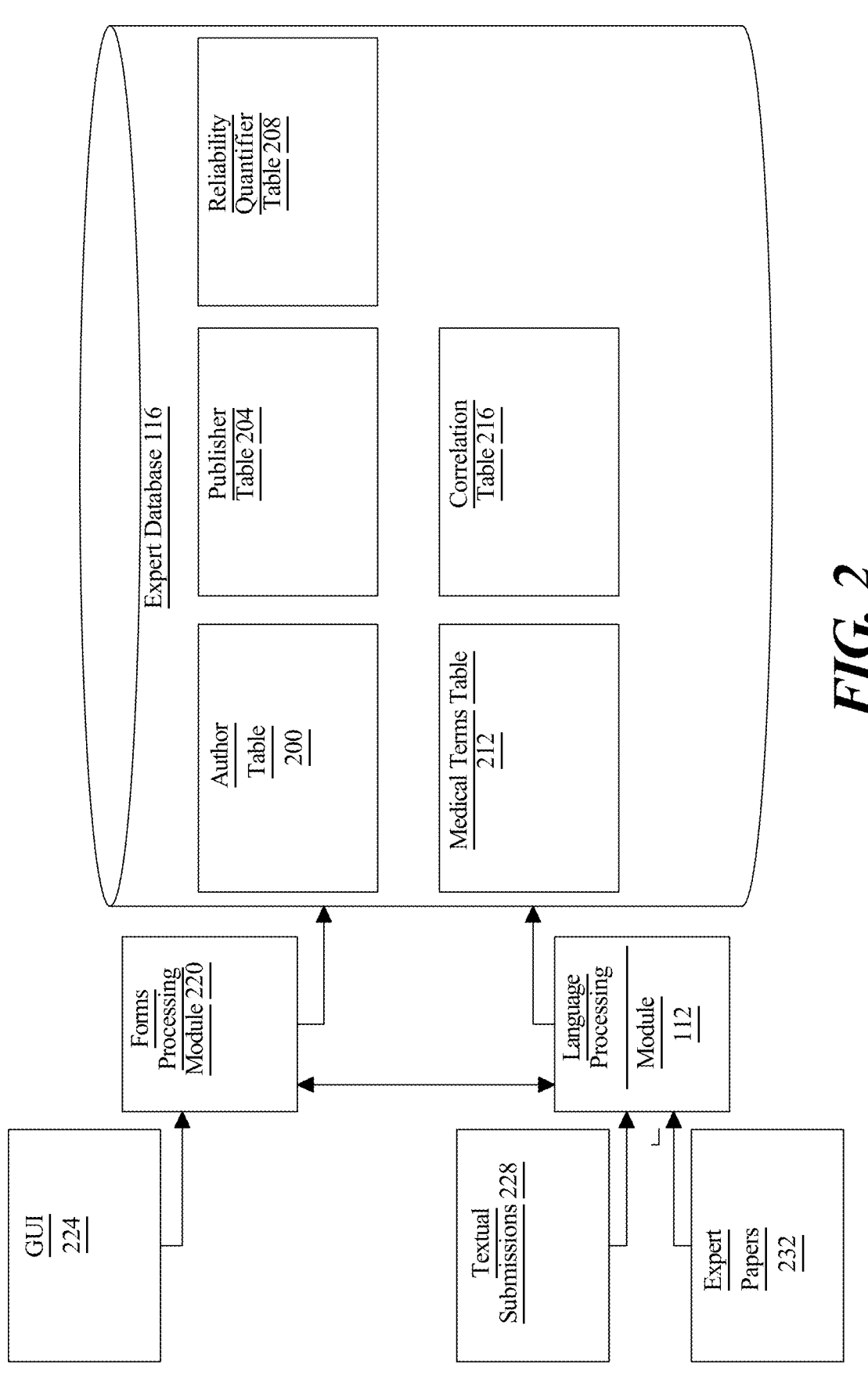
FIG. 2 is a block diagram illustrating an exemplary embodiment of an expert database.

Referring now to FIG. 2, an exemplary embodiment of an expert database is illustrated. Expert database may, as a non-limiting example, organize data stored in the expert database according to one or more database tables. One or more database tables may be linked to one another by, for instance, common column values. For instance, a common column between two tables of expert database may include an identifier of an expert submission, such as a form entry, textual submission, expert paper, or the like, for instance as defined below; as a result, a query may be able to retrieve all rows from any table pertaining to a given submission or set thereof. Other columns may include any other category usable for organization or subdivision of expert data, including types of expert data, names and/or identifiers of experts submitting the data, times of submission, or the like; persons skilled in the art, upon reviewing the entirety of this disclosure, will be aware of various ways in which expert data from one or more tables may be linked and/or related to expert data in one or more other tables.

Still referring to FIG. 2, one or more database tables in expert database may include, as a non-limiting example, an author information table 200, which may be used to store records indicating an identity of an author, a history of publications or other works by the author, one or more author themes, or the like. One or more tables may include a publisher table 204, which may store data describing identities of publishers, previously publisher themes, categories of publications ascribed to publishers, or the like. One or more tables may include a reliability quantifier table 208, in which textual works 108 and related reliability quantifiers may be stored, including history of reliability quantifiers determined for accepted and/or rejected scholarly works as described below. One or more tables may include a medical terms table 121, which may contain a listing of terms and/or textual elements describing medical treatments, diagnostic elements, or the like. One or more tables may include a correlation table 216, which may be populated using correlations derived from scholarly works as described in further detail below; correlations may alternatively or additionally be populated in various tables as categorized by themes or other information according to which such correlations may be categorized.

In an embodiment, and still referring to FIG. 2, a forms processing module 220 may sort data entered in a submission via a graphical user interface 224 receiving expert submissions by, for instance, sorting data from entries in the graphical user interface 224 to related categories of data; for instance, data entered in an entry relating in the graphical user interface 224 to significance may be sorted into variables and/or data structures for impact score data, which may be provided to significance table 400, while data entered in an entry relating to temporal effects on events disease may be sorted into variables and/or data structures for the storage of such data, such as temporal effect, relative frequencies may be sorted to relative frequency table, and the like. Where data is chosen by an expert from pre-selected entries such as drop-down lists, data may be stored directly; where data is entered in textual form, a language processing module may be used to map data to an appropriate existing label, for instance using a vector similarity test or other synonym-sensitive language processing test to map data to existing labels and/or categories. Similarly, data from an expert textual submissions 228, such as accomplished by filling out a paper or PDF form and/or submitting narrative information, may likewise be processed using language processing module, and/or using processes and/or process steps as described in this disclosure.

Data may be extracted from expert papers 232, which may include without limitation publications in medical and/or scientific journals, by language processing module via any suitable process as described herein. Persons skilled in the art, upon reviewing the entirety of this disclosure, will be aware of various additional methods whereby novel terms may be separated from already-classified terms and/or synonyms therefore, as consistent with this disclosure.

Referring again to FIG. 1, computing device 104 may be configured to identify a category of textual work 108 by generating a category classifier 120, as a function of the training data, and identifying the textual work 108 using the category classifier 120. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as $P(A/B)=P(B/A)$ $P(A)÷P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample- features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2} \,,$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 104 may be configured to determine at least a work theme of textual work 108. As used in this disclosure, a "work theme" is a topic of scientific and/or medical research. Work theme may include a principal them, defined as a main topic of a work. Textual work 108 may have a single work theme and/or a plurality of work themes; for instance, a single work may refer to a given treatment process or other protocol as alleviating a first condition, but also note and/or further describe another condition alleviated by the same treatment which is otherwise unrelated in literature and/or by specialty to the first condition. As a further example, textual work 108 may be cross-disciplinary, and may thus contain content relating to two or more normally separate and/or siloed topic areas, which may be represented as two or more work themes.

With continued reference to FIG. 1, determining work theme may include receiving theme training data 124. Theme training data 124 may be implemented in any form suitable for implementation of category training data as described above. Theme training data 124 may include a plurality of entries. Each entry may include a training textual element and a correlated theme. A "training textual element," as used in this disclosure, is a textual element as defined above that is used as a training data entry. Computing device 104 may train a theme classifier 128 as a function of the training data. Theme classifier 128, which may be implemented as any classifier as described above, may take a plurality of textual elements as inputs, and output a work theme. Theme classifier 128 may be trained using any classification algorithm as described above. Computing device 104 may determine at least a work theme as a function of the plurality of textual elements and the theme classifier 128, for instance by inputting plurality of textual elements and outputting work theme. In an embodiment, computing device 104 may modify plurality of textual elements to match elements used in training data; for instance, computing device 104 may match words and/or phrases of plurality of textual elements to synonymous or otherwise semantically related words in training data. For instance, and without limitation, computing device 104 may match at least a textual element of plurality of textual elements to a training textual element as a function of a language processing module, for instance using vector similarity or the like. The matching training textual element may be used in place of the at least a textual element; in other words, computing device 104 may determine at least a work theme as a function of training textual element and theme classifier 128.

Still referring to FIG. 1, computing device 104 may be configured to calculate a reliability quantifier 132 of textual work 108. A "reliability quantifier 132," as used in this description, is a quantitative variable and/or field containing a number representing a degree to which a textual work 108 may be relied upon as a good source of information, recommendations, training data, or the like. Computing device 104 may calculate reliability quantifier 132 using one or more data regarding textual work 108. For instance, computing device 104 may calculate reality quantifier may calculate as a function of the at least a work theme, the author, and the category. Computing device 104 may generate one or more numerical quantities which may be combined by addition and/or multiplication to derive reliability quantifier 132. As a non-limiting, illustrative example, reliability quantifier 132 may be initialized to a maximal value of 1 and each numerical quantity to be used to compute reliability score may be a number between 0 and 1 which may be multiplied by reliability quantifier 132 to furnish a final result between 0 and 1 which may be used to quantify reliability of textual work 108. As a further example, component quantities may be combined in a calculation performed using a machine-learning process and/or model; for instance, and without limitation, relationships between inputs as described below and reliability may be sufficiently complex as to render multiplication of factors insufficient to capture all cases, in which case a machine-learning process may be used to generate a more complex model that effectively captures such relationships to generate an accurate result.

Figure 3:
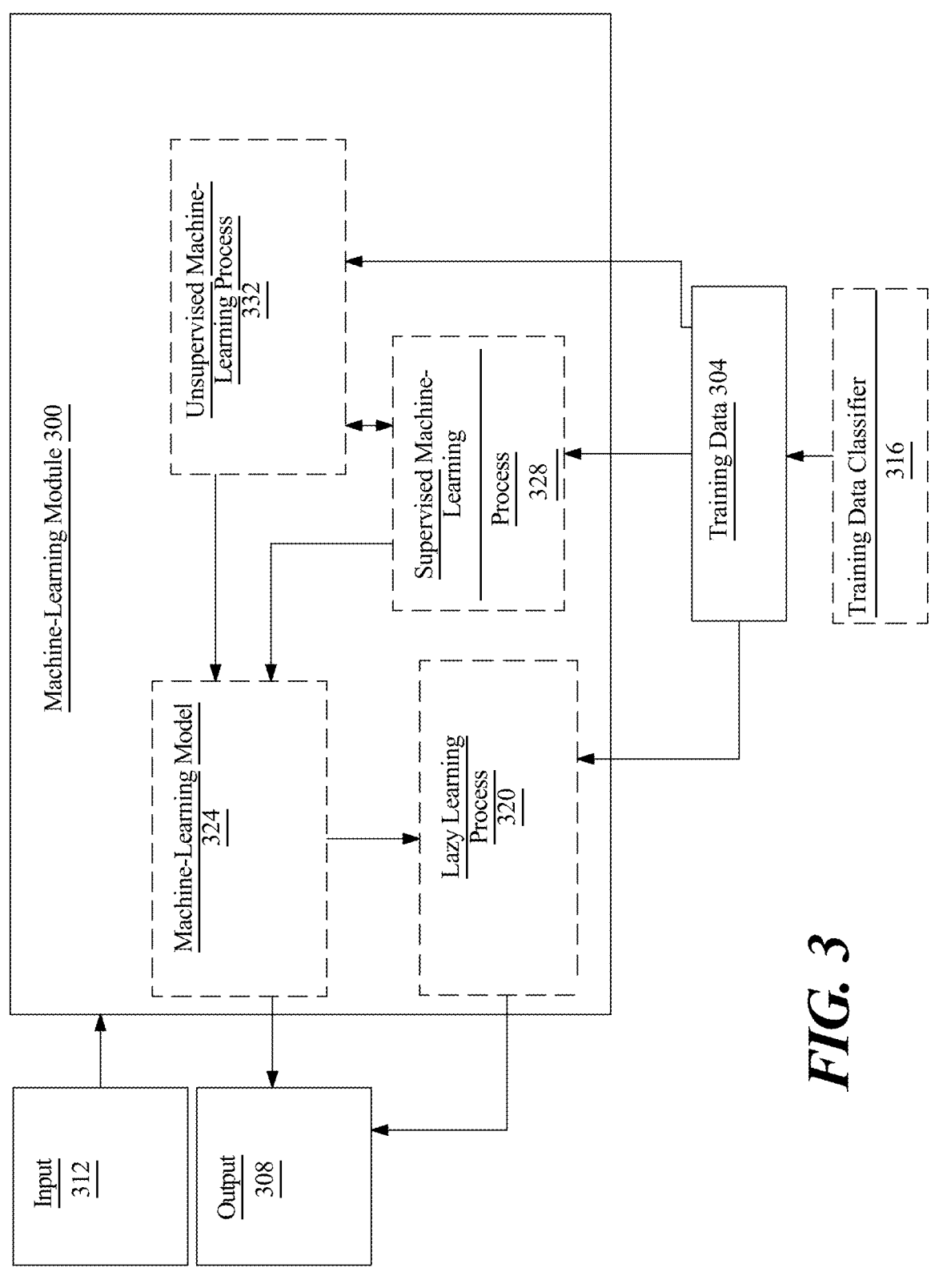
FIG. 3 is a block diagram illustrating an exemplary embodiment of a machine-learning module.

Referring now to FIG. 3, an exemplary embodiment of a machine-learning module 300 that may perform one or more machine-learning processes as described in this disclosure, is illustrated. Machine-learning module may include any suitable Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device 104/module to produce outputs 308 given data provided as inputs 312; this is in contrast to a non-machine learning software program where the commands to be executed are determined in advance by a user and written in a programming language.

In an embodiment, training data may be formed using one or more expert inputs; for instance, one or more experts may indicate that a given work, article, or the like of their choice represents an minimal state at which those experts would rely on the article, and associated reliability quantifiers 132 may be aggregated, averaged, or the like to calculate a threshold number.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device 104 and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to one or more work themes.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning model 324s. A "machine-learning model 324," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs for calculation of reliability quantifier 132 as inputs, reliability quantifier 132 values as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 304.

Referring again to FIG. 1, one or more quantities used to determine reliability quantifier 132 may be calculated, without limitation, by determining a degree of similarly between at least a work theme and at least an author theme, where an "author theme" is a theme, such as any theme suitable for use as a work theme, typically addressed by author. Degree of similarity may be determined, without limitation, by using any distance metric suitable for use in a classifier as described above. Degree of similarity may be normalized to a value between 0 and 1. In an embodiment, at least an author theme may be stored in a database, such as without limitation expert database 116. Alternatively or additionally, one or more author themes may be determined using an author theme classifier 128. For instance, computing device 104 may receive a plurality of publications by the at least an author, to input to author theme classifier 128. Computing device 104 may training author theme classifier 128, using the theme training data 124; author theme classifier 128 may accept publications and/or textual elements as inputs and output author themes. Computing device 104 may identify at least an author theme as a function of the plurality of publications and the author theme classifier 128, by inputting plurality of author publications to author theme classifier 128.

Alternatively or additionally, and still referring to FIG. 1, one or more quantities used to determine reliability quantifier 132 may be calculated, without limitation, by determining a degree of similarly between at least a work theme and at least an publication theme, where an "publication theme" is a theme, such as any theme suitable for use as a work theme, typically addressed in a publication in which textual work 108 appears. Degree of similarity may be determined, without limitation, by using any distance metric suitable for use in a classifier as described above. Degree of similarity may be normalized to a value between 0 and 1. In an embodiment, at least a publication theme may be stored in a database, such as without limitation expert database 116. At least a publication theme may be determined, as a non-limiting example, by identifying one or more phrases in a header of publication and/or in a field of data provided with and/or concerning publication, indicating a theme and/or principal theme to which the publication is dedicated, such as a field of science, medicine, or the like. Alternatively or additionally, determining at least a publisher theme may include receiving a plurality of publications of the publisher. Computing device 104 may train a publisher theme classifier 128 using theme training data 124; publisher theme classifier 128 may receive plurality of publications as inputs an output at least a publisher theme. Computing device 104 may identify at least a publisher theme as a function of the plurality of publications and the publisher theme classifier 128.

With continued reference to FIG. 1, computing device 104 may generate one or more additional quantities for computation of reliability quantifier 132. One or more quantities may include, without limitation, a quantity representing document type, which may be normalized as above. For instance, and without limitation, a greater quantity may be associated with a peer reviewed journal article, a lesser quantity with a non-peer reviewed journal article, a lesser quantity still with a non-journal article, and a still lesser quantity with a webpage; thus, as a non-limiting example and all other factors being equal, if textual work 108 is a peer reviewed journal article, it may have a higher reliability quantifier 132 than if it is a popular science article.

Still referring to FIG. 1, one or more quantities may include, without limitation, a quantity representing publication type, which may be normalized as above. For instance, and without limitation, a greater quantity may be associated with a specialized publication, defined as a publication having a narrow focus on a range of similar publication themes, where "similarity" may be determined using distance metrics as described above. Continuing the example, a lesser quantity may be associated with a non-specialized journal, such as a journal having publisher themes that are more divergent according to distance metrics as described above. Further continuing the example, a non-scientific periodical such as a popular science and/or news publication may receive a still lesser quantity.

Continuing to refer to FIG. 1, one or more quantities may include, without limitation, one or more prestige factors, where a "prestige factor" is defined as a factor based on rating in a scientific and/or medical community of an author and/or publication. For instance, a journal prestige factor may be higher and/or greater for a journal recognized as prestigious, reliable, and/or influential than for a journal that is less recognized; journal prestige factor may be measurable at various gradations representing various degrees of journal prestige. As another example, an expert prestige factor may be higher and/or greater for an author recognized as prestigious, reliable, and/or influential than for an author that is less recognized; expert prestige factor may be measurable at various gradations representing various degrees of author prestige. Author prestige may be calculated without limitation by receiving a plurality of ratings by other experts of author and averaging or otherwise aggregating such ratings.

With further reference to FIG. 1, at least a work theme may include a first work theme and a second work theme, and/or any number of additional work themes; computing device 104 may calculate a first reliability quantifier 132 for the first work theme and a second reliability quantifier 132 for the second work theme. For instance, textual work 108 may be given a higher reliability quantifier 132 with regard to first work theme because first work theme may have a greater similarity to author theme and/or publisher theme; textual work 108 may be given a lower reliability quantifier 132 with regard to second work theme because of a lesser degree of similarity between second work theme and author theme and/or publisher theme. Persons skilled in the art, upon reviewing the entirety of this disclosure, will be aware of various ways in which a first work theme may result in a different reliability quantifier 132 from a second work theme, based on quantities that may be calculated per theme as described above. Alternatively, there may be a reliability quantifier 132 per theme, which may be aggregated, for instance and without limitation by averaging or the like, to produce an overall reliability quantifier 132.

Still referring to FIG. 1, computing device 104 is configured to select the textual work 108 as a function of the reliability quantifier 132. For instance, and without limitation, computing device 104 may compare reliability quantifier 132 to a preconfigured threshold number. Threshold number may be set based on one or more expert inputs; for instance, one or more experts may indicate that a given work, article, or the like of their choice represents an minimal state at which those experts would rely on the article, and associated reliability quantifier 132$s$ may be aggregated, averaged, or the like to calculate a threshold number. Alternatively or additionally, threshold number may be an average or other aggregated value of reliability quantifier 132$s$ of works already selected.

With continued reference to FIG. 1, threshold may be calculated for comparison to single reliability quantifier 132 calculated per document. Alternatively or additionally, a different threshold may be calculated for each work theme as described above. A reliability quantifier 132 of each theme may be compared to a threshold corresponding to that theme. As a result, textual work 108 may be accepted for one work theme and rejected for another work theme.

Still referring to FIG. 1, where textual work 108 is rejected for failing to meet a threshold, no further process steps may be performed with regard to that work; alternatively or additionally, an entry indicating reliability quantifier 132 and/or rejected status of work may be stored in expert database 116. Where at least a reliability quantifier 132 is accepted, computing device 104 is configured to derive, from textual work 108, at least a correlation between a diagnostic element, defined for purposes of this disclosure as any diagnosis, prognosis, prognostic element, test result, or other data suitable for identifying a disease state currently suffered and/or likely to occur in the future and a practice, where a "practice" as used herein is any action or combination of actions to alleviate and/or prevent a disease state indicated by prognostic element. Derivation may be performed by analysis of language of scholarly work to identify one or more recommendations; for instance one or more recommendations may include text associated with an introductory statement, paragraph introduction, and/or point heading that has a high statistical correlation with recommendations, such as without limitation a term like "recommendation," "we recommend," or the like. Such correlations may be identified by language processing module, and blocks of text containing recommendations may be identified by entry of one or more such terms by an expert or other user; other correlated terms may be identified using correlations, permitting language module to find such recommendations. In an embodiment, and still referring to FIG. 1, computing device 104 may extract and/or identify correlations in specific sections, a conclusion, an abstract, or the like, and may subsequently locate and/or identify corresponding and/or related text in analysis to further aid in accuracy of identified correlations.

Alternatively or additionally, correlation may be identified in textual work 108 by matching at least a statement and/or paragraph in textual work 108 to an action that may be recommended, such as without limitation a medical treatment or the like. For instance, expert database 116 may include a listing of terms and/or textual elements describing medical treatments or the like; such terms and/or textual elements may matched to one or more textual elements within textual work 108 using language processing module using any suitable relationship as described above, including without limitation vector similarity. Sentences and/or paragraphs containing terms so identified may be treated as blocks of text containing correlations. As a further example, terms associated with positive and/or negative results may be stored in expert database 116 or other suitable datastore, related and/or synonymous terms may be identified using language processor, and blocks of text containing terms so identified may be identified as containing potential correlations.

Further referring to FIG. 1, blocks of text containing recommendations and/or other material used for correlations may additionally be parsed for terms and/or other textual elements associated with a theme, as identified using work theme classifier 128 and/or using language processing module; blocks of text containing recommendation may be used to derive at least a correlation only where such blocks are matched and/or classified using work theme classifier 128 to a work theme for which textual work 108 has an associated reliability quantifier 132 exceeding a work theme-specific threshold.

Still referring to FIG. 1, derivation of correlation may further include extraction of a first element indicating a condition, symptom, and/or biological extraction and a second element indicating an action that is recommended and/or an action that is not recommended with regard to a person presenting with the identified condition, symptom, and/or biological extraction. Biological extraction and/or receipt thereof may be implemented in any manner disclosed in U.S. Non-provisional application Ser. No. 16/865,740, filed on May 4, 2020, and entitled "METHODS AND SYSTEMS FOR SYSTEM FOR NUTRITIONAL RECOMMENDATION USING ARTIFICIAL INTELLIGENCE ANALYSIS FOR IMMUNE IMPACTS," the entirety of which is incorporated herein by reference. Action may include, without limitation administration of a given treatment, course of treatments, pharmaceutical dosage and/or prescription, a recommended therapy, a recommended nutritional input, a surgical procedure, a course of physical therapy, an exercise program or other recommended fitness-related action, a recommended lifestyle change such as cessation of substance abuse, increased sleep, or the like, and/or any other action for the alleviation and/or improvement of one or more conditions, symptoms or health risks that may occur to persons skilled in the art upon reviewing the entirety of this disclosure.

Further referring to FIG. 1, an element of text indicating an action and/or a diagnostic element may be associated with textual element describing the same action that has been stored in previously recorded entries in an expert database 116. Association may be performed, without limitation, using language processing module, which may identify synonymous terms, phrases, and/or blocks of text according to any process as described above. A new entry in expert database 116 may be generated using identified diagnostic element and a correlated action determined as above; in an embodiment either or both of diagnostic element and correlated action may be replaced by identified associated terms, which may, for instance, enable training data generated therefrom to use a smaller set of selected terms, which may in turn improve accuracy and/or efficiency of subsequent machine-learning and/or classification processes that may be performed using resulting training data.

In an embodiment, and still referring to FIG. 1, language processing module may be used to distinguish between positive recommendations and negative recommendations. In an embodiment, this may be performed by detection of words and/or phrases that function as negations, such as "not," "no effect," "negligible effect," or the like. Alternatively or additionally, phrase comparison and/or placement within language processing module objects such as vector space may include phrases that contain negations and/or other terminology that acts to indicate that an action is disfavored. As a further example, statistical correlations and/or mathematical associations may include probabilistic formulas or relationships indicating a positive and/or negative association between at least an extracted word and/or a given action; positive or negative indication may include an indication that a given document is or is not recommending an action. For instance, and without limitation, a negative indication may be determined from a phrase such as "increased physical activity was not found to be an effective way to slow progression of dementia," whereas a positive indication may be determined from a phrase such as "increased physical activity was found to be an effective way to slow progression of dementia," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory of computing device 104, or the like.

In an embodiment, and with continued reference to FIG. 1, one or more selected correlations may be inspected by a user, such as an expert user; expert user may verify that an inspected correlation accurately reflects a recommendation and/or finding in textual work 108. Where expert indicates correlation is inaccurate, expert may enter an indication indicating inaccuracy and/or an alternative correlation that is more accurate; such entries by expert may be used to train language processing module further, modifying one or more associations used to identify and/or characterize correlations. Entries may alternatively or additionally be used to generate alternative correlations, for instance as entered by reviewing user.

Still referring to FIG. 1, computing device 104 is configured to store the at least a correlation in an expert database 116. A record may be stored, for instance in expert database 116 indicating correlation. Additional elements of data may be stored with correlation, including without limitation a reliability quantifier 132 associated with textual work 108 generally and/or with regard to a related work them. Additional elements may include one or more work themes identified as associated with correlation. Additional elements may include an identifier of textual work 108, which may for instance be used in further processing regarding entry and/or textual work 108 as described in further detail below. For instance, and without limitation, computing device 104 may perform modification and/or removal of entries from expert database 116 as described below, based, without limitation, upon retractions and/or negative citations.

Further referring to FIG. 1, computing device 104 may be configured to use correlation and/or textual work 108 to create one or more training data elements. For instance, an association with textual work 108 with a work theme may be recorded as theme training data 124, entries of which may associate textual elements of textual work 108 with one or more work themes; this may be used to further train theme classifier 128 using methods as described above. Correlation may be used in training data for further classification and/or machine-learning processes used for instance to recommend treatments or other ameliorative processes for alleviation, cure, and/or treatment of conditions associated with diagnostic elements as described above. Training data entries so used may, in a non-limiting example, be weighted by reliability quantifier 132; this may, for instance, enable resulting machine-learning processes and/or classifiers to generate models using algorithms that account for such weighting, which may result in greater accuracy.

With continued reference to FIG. 1, computing device 104 may be configured to validate correlations stored in expert database 116. In some embodiments, validating expert correlations stored in expert database 116 may include comparing the correlation between the dietary practice and alleviation of the disease state to a set of expert correlations from the expert database. For the purposes of this disclosure, an "expert correlation" is a correlation in expert database. In some embodiments, validating the expert correlations stored in expert database may include calculating a database reliability score. A "database reliability score," as a function of this disclosure, is a score that represents the accuracy and range of expert correlations in expert database. In some embodiments, if the correlation between the dietary practice and alleviation of the disease state does not appear in expert database, such as as a function of comparing the correlation between the dietary practice and alleviation of the disease state to a set of expert correlations from the expert database, then database reliability score may be negatively impacted. Particularly, this may be true if the reliability quantifier 132 is favorable. In a non-limiting example, if reliability quantifier 132 is unfavorable and the correlation between the dietary practice and alleviation of the disease state does not appear in expert database, then database reliability score may be positively impacted. In some embodiments, if the correlation between the dietary practice and alleviation of the disease state does appear in expert database, such as as a function of comparing the correlation between the dietary practice and alleviation of the disease state to a set of expert correlations from the expert database, then database reliability score may be positively impacted. Particularly, this may be true if the reliability quantifier 132 is favorable. In some embodiments, if the correlation between the dietary practice and alleviation of the disease state does appear in expert database, such as as a function of comparing the correlation between the dietary practice and alleviation of the disease state to a set of expert correlations from the expert database, and reliability quantifier is negative, then database reliability score may be negatively impacted.

Figure 4:
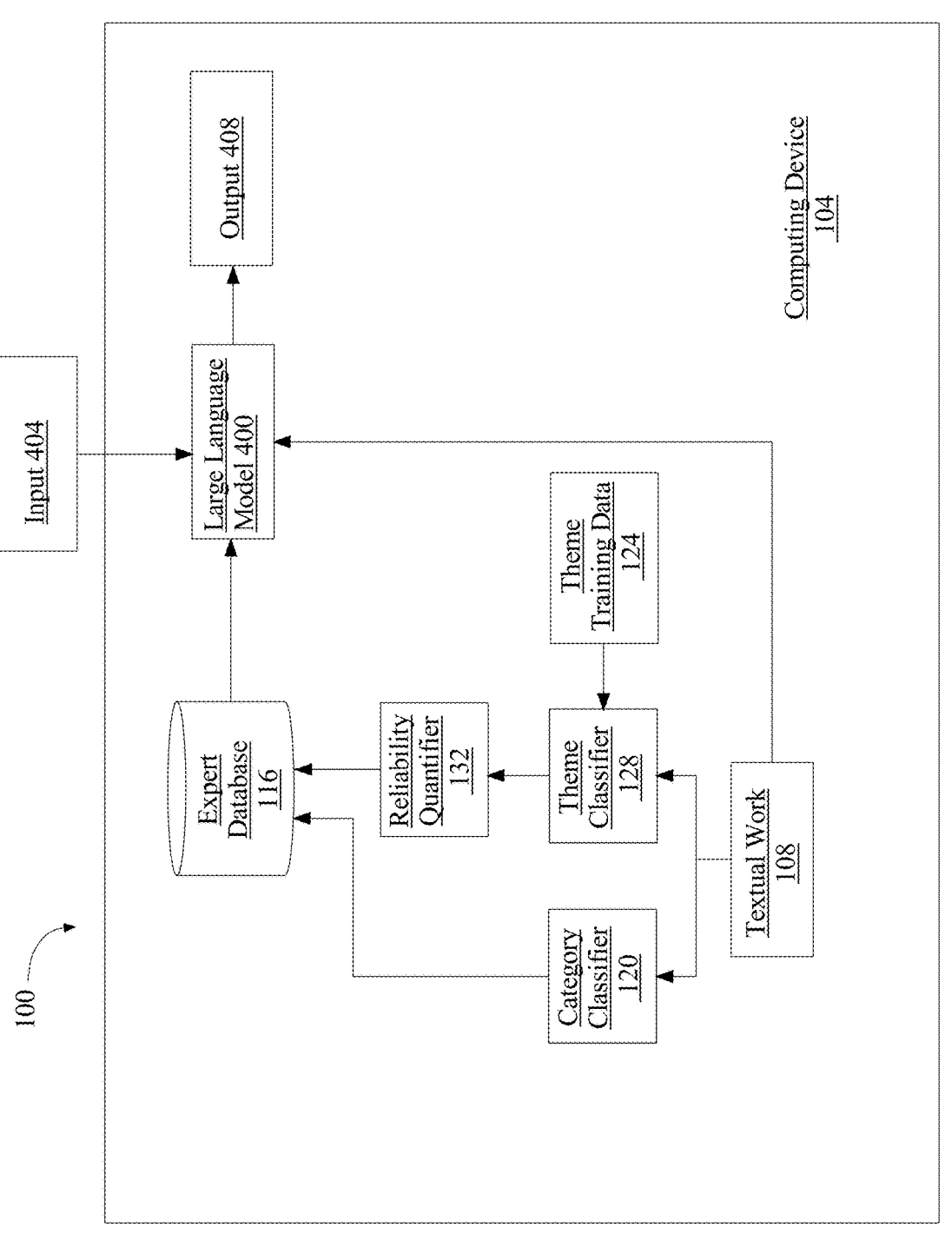
FIG. 4 is a block diagram of another exemplary embodiment of a system for classification of textual works.

Referring now to FIG. 4, an exemplary embodiment of system 100 for classification of textual works is illustrated. System 100 may include a large language model 400 (LLM). A "large language model," as used herein, is a deep learning algorithm that can recognize, summarize, translate, predict and/or generate text and other content based on knowledge gained from massive datasets. Large language model 400 may be trained on large sets of data; for example, training sets may include greater than 1 million words. Training sets may be drawn from diverse sets of data such as, as non-limiting examples, novels, blog posts, articles, emails, and the like. In some embodiments, training sets may include a variety of subject matters, such as, as nonlimiting examples, medical tests, romantic ballads, beat poetry, emails, advertising documents, newspaper articles, and the like. In some embodiments, training sets of LLM 400 may include a plurality of textual works 108. In some embodiments, training sets of LLM 400 may include expert database 116. As a non-limiting example, training sets may include scholastic works. As a non-limiting example, training sets may include dietary practices correlated to alleviation of disease state, which may be stored in expert database 116. In some embodiments, training sets may include portions of textual works 108 related to dietary practices correlated to portions of textual works 108 related to alleviation of disease states.

With continued reference to FIG. 4, in some embodiments, LLM 400 may be generally trained. For the purposes of this disclosure, "generally trained" means that LLM 400 is trained on a general training set comprising a variety of subject matters, data sets, and fields. In some embodiments, LLM 400 may be initially generally trained. In some embodiments, for the purposes of this disclosure, LLM 400 may be specifically trained. For the purposes of this disclosure, "specifically trained" means that LLM 400 is trained on a specific training set, wherein the specific training set includes data including specific correlations for LLM 400 to learn. As a non-limiting example, LLM 400 may be generally trained on a general training set, then specifically trained on a specific training set. As a non-limiting example, specific training set may include textual works 108. As a non-limiting example, specific training set may include scholastic works. As a non-limiting example, specific training set may include information from expert database 116. As a non-limiting example, specific training set may include dietary practices correlated to alleviation of disease state, which may be stored in expert database 116. In some embodiments, specific training set may include portions of textual works 108 related to dietary practices correlated to portions of textual works 108 related to alleviation of disease state.

With continued reference to FIG. 4, LLM 400, in some embodiments, may include Generative Pretrained Transformer (GPT), GPT-2, GPT-3, GPT-4, and the like. GPT, GPT-2, GPT-3, and GPT-4 are products of Open AI Inc., of San Francisco, CA. LLM 400 may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM 400 may output such predictions by ranking words by likelihood or a prompt parameter. For the example given above, the LLM may score "you" as the most likely, "your" as the next most likely, "his" or "her" next, and the like. LLM 400 may include an encoder component and a decoder component.

Still referring to FIG. 4, LLM 400 may include a transformer architecture. In some embodiments, encoder component of LLM 400 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 4, LLM 400 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 4, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 400 may predict the next word by searching for a set of position in a source sentence where the most relevant information is concentrated. LLM 400 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 4, an attention mechanism may include generalized attention self-attention, multi-head attention, additive attention, global attention, and the like. In generalized attention, when a sequence of words or an image is fed to LLM 400, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 400 may pick up particular parts at different positions in the input sequence and over time compute an initial composition of the output sequence. In multi-head attention, LLM 400 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 400 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bandanau attention mechanism), LLM 400 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 400 may either attend to all source words or predict the target sentence, thereby attending to a smaller subset of words.

With continued reference to FIG. 4, multi-headed attention in encoder may apply a specific attention mechanism called self-attention. Self-attention allows the models to associate each word in the input, to other words. So, as a non-limiting example, the LLM 400 may learn to associate the word "you", with "how" and "are". It's also possible that LLM 400 learns that words structured in this pattern are typically a question and to respond appropriately. In some embodiments, to achieve self-attention, input may be fed into three distinct fully connected layers to create query, key, and value vectors. The query, key, and value vectors maybe fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 4, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 4, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 4, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 4, in some embodiments, input to decoder may go through an embedding layer and positional encoding layer in order to obtain positional embeddings. Decoder may include a fist multi-headed attention layer, wherein the first multi-headed attention layer may receive positional embeddings.

With continued reference to FIG. 4, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0 s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 4, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 4, the output of the pointwise feedforward layer may be fed through a final linear layer. This final linear layer may act as a classifier. This classifier may be as big as the number of classes that you have. For example, if you have 10,000 classes for 10,000 words, the output of that classier will be of size 10,000. The output of this classifier may be fed into a softmax layer which may serve to produce probability scores between zero and one. The index may be taken of the highest probability score in order to determine a predicted word.

With continued reference to FIG. 4, decoder may take this output and add it to the decoder inputs. Decoder may continue decoding until a token is predicted. Decoder may stop decoding once it predicts an end token.

With continued reference to FIG. 4, in some embodiment, decoder may be stacked N layers high, with each layer taking in inputs from the encoder and layers before it. Stacking layers may allow LLM 400 to learn to extract and focus on different combinations of attention from its attention heads.

With continued reference to FIG. 4, LLM 400 may receive an input 404. Input 404 may include a string of one or more characters. For example, input may include one or more words, a sentence, a paragraph, a thought, a query, and the like. A "query" for the purposes of the disclosure is a string of characters that poses a question. In some embodiments, input 404 may be received from a user device. User device may be any computing device that is used by a user. As non-limiting examples, user device may include desktops, laptops, smartphones, tablets, and the like. Query may include, for example a question asking for a dietary practice for a certain disease state. In some embodiments, input 404 may include a set of symptoms or test results for a user.

With continued reference to FIG. 4, LLM 400 may generate output 408. In some embodiments, LLM 400 may include multiple sets of transformer architecture as described above. Output 408 may include a textual output. A "textual output," for the purposes of this disclosure is an output comprising a string of one or more characters. Textual output may include for example, a dietary practice. In some embodiments, dietary practice may be a dietary practice from expert database 116. In some embodiments, textual output may include a phrase or sentence suggesting dietary practice to user. In some embodiments, textual output may include a phrase or sentence suggesting dietary practice to user. In some embodiments, textual output may include a sentence or plurality of sentences describing dietary practice to user; as non-limiting examples, this may include, restrictions, timing, advice, dangers, benefits, and the like.

Figure 5:
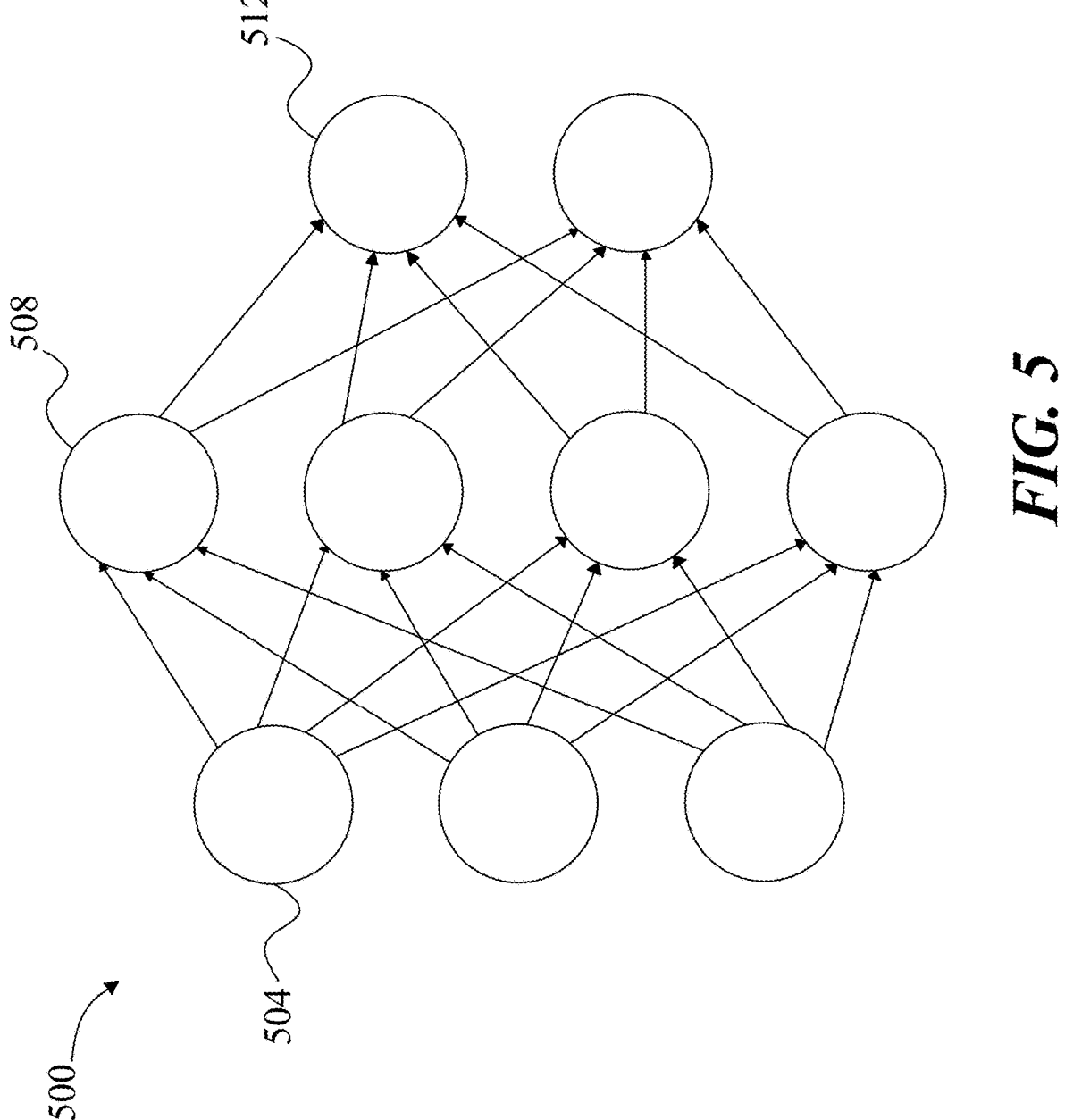
FIG. 5 is a diagram of an exemplary embodiment of neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
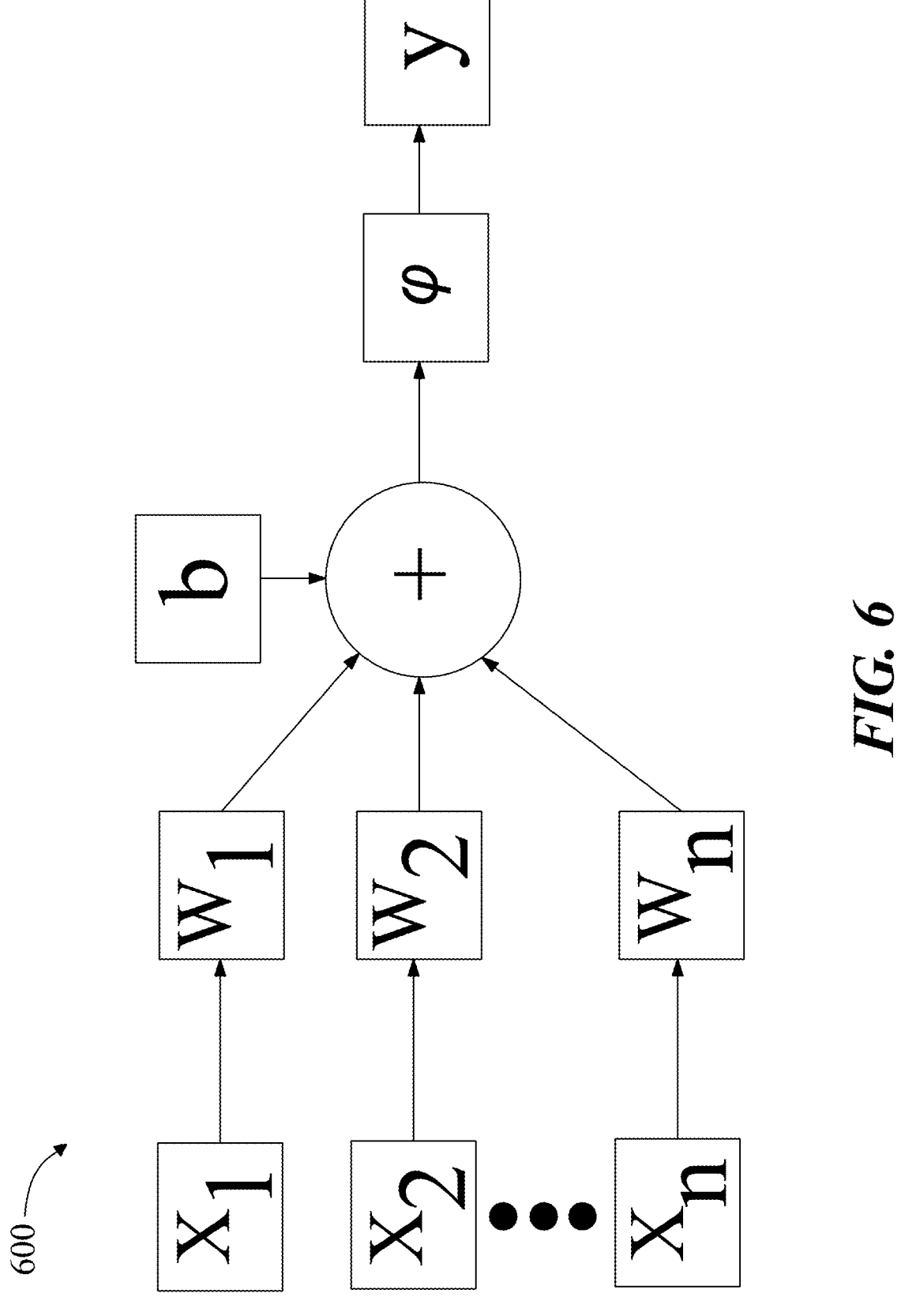
FIG. 6 is a diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form a $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
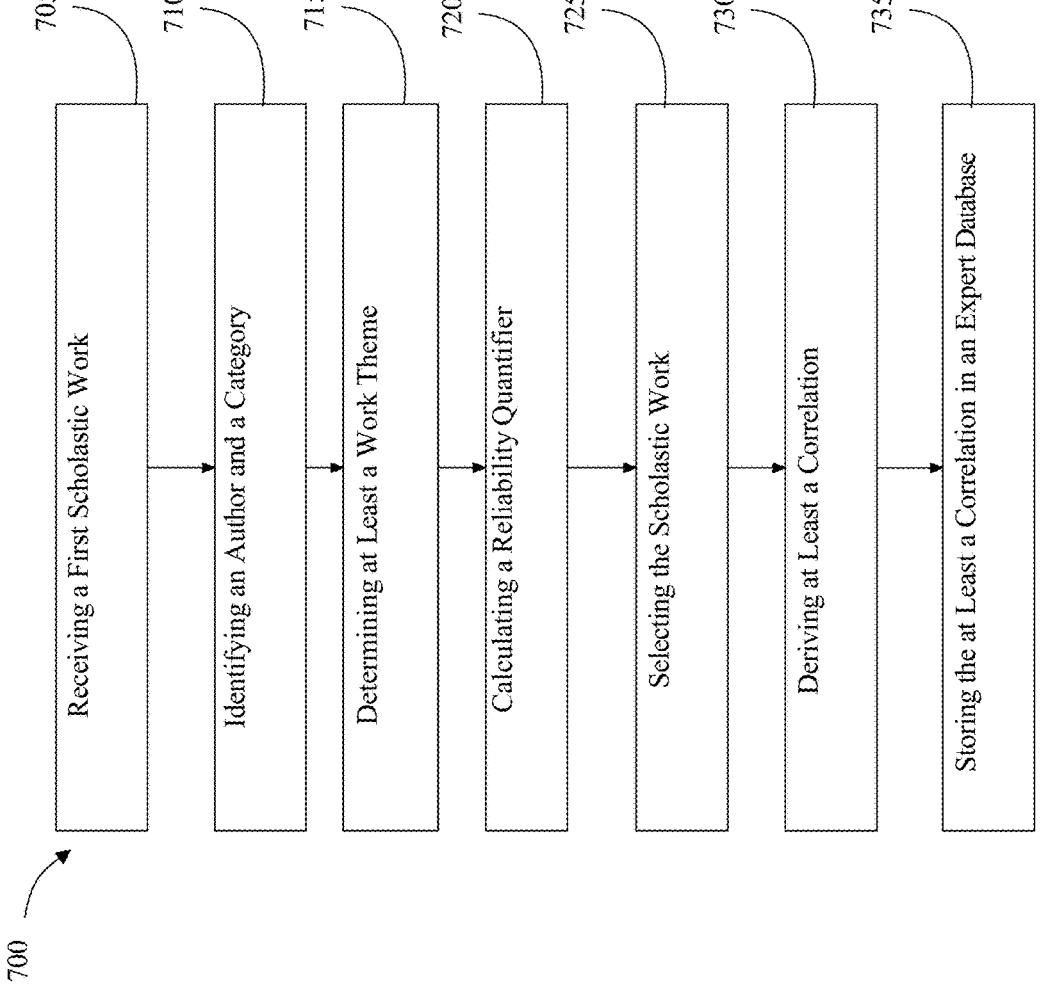
FIG. 7 is a flow diagram illustrating an exemplary embodiment of a method of classification of textual works.

Referring now to FIG. 7, an exemplary embodiment of a method 700 of classification of textual works 108 is illustrated. At step 705, a computing device 104 receives a first textual work 108 including a plurality of textual elements; this may be implemented, without limitation, as described above in reference to FIGS. 1-6.

At step 710, and still referring to FIG. 4, computing device 104 identifies an author and a category; this may be implemented, without limitation, as described above in reference to FIGS. 1-6. Identifying category may include receiving category training data, which may include a plurality of entries. Each entry may include at least a portion of a work and a correlated category. Computing device 104 may generate a category classifier 120, as a function of the training data. Computing device 104 may identify the textual work 108 using the category classifier 120.

With continued reference to FIG. 4, at step 715 computing device 104 determines at least a theme; this may be implemented, without limitation, as described above in reference to FIGS. 1-6. Determining may include receiving theme training data 124. Theme training data 124 including a plurality of entries, each entry including a training textual element and a correlated theme. Determining may include training a theme classifier 128 as a function of the training data. Determining may include determining the at least a work theme as a function of the plurality of textual elements and the theme classifier 128. Determining the at least a theme may include matching at least a textual element of the plurality of textual elements to a training textual element as a function of a language processing module and determining the at least a work theme as a function of the training textual element and the theme classifier 128.

At step 720, and still referring to FIG. 4, computing device 104 calculates a reliability quantifier 132 as a function of the at least a theme, the author, and the category; this may be implemented, without limitation, as described above in reference to FIGS. 1-6. Calculating the reliability quantifier 132 may include receiving a plurality of publications by the at least an author, training an author theme classifier 128 using the theme training data 124, and identifying at least an author theme as a function of the plurality of publications and the author theme classifier 128. Computing device 104 may compare at least an author theme to work theme. Computing device 104 may calculate reliability quantifier 132 as a function of the comparing. Calculating reliability quantifier 132 may include identifying a publisher of the first textual work 108. Computing device 104 may determine at least a publisher theme of publisher. Determining at least a publisher theme may include receiving a plurality of publications of the publisher, training a publisher theme classifier 128 using the theme training data 124, and identifying the at least a publisher theme as a function of the plurality of publications and the publisher theme classifier 128. Computing device 104 may compare at least a publisher theme to the theme. Computing device 104 may calculate reliability quantifier 132 as a function of the comparing. In an embodiment, at least a theme may include a first theme and a second theme, and computing device 104 may calculate a first reliability quantifier 132 for the first theme and a second reliability quantifier 132 for the second theme. In some embodiments, step 720 may include determining an expert prestige factor, wherein the expert prestige factor quantifies the prestige of the author; this may be implemented, without limitation, as described above in reference to FIGS. 1-6. In some embodiments, the expert prestige factor relates to the reliability of the author; this may be implemented, without limitation, as described above in reference to FIGS. 1-6. In some embodiments, the expert prestige factor may be based on the reputation of the author in the scientific community of the author; this may be implemented, without limitation, as described above in reference to FIGS. 1-6.

At step 725, computing device 104 selects textual work 108 as a function of reliability quantifier 132; this may be implemented, without limitation, as described above in reference to FIGS. 1-6.

At step 730, in some embodiments, computing device 104 may derive at least a correlation between a diagnostic element and a practice from the textual work 108; this may be implemented, without limitation, as described above in reference to FIGS. 1-6. In other embodiments, computing device 104 may derive, from the textual work 108, at least a correlation between a dietary practice and alleviation of a disease state; this may be implemented, without limitation, as described above in reference to FIGS. 1-6.

In some embodiments, method 700 may include a step 735. At step 735, computing device 104 may store at least a correlation in an expert database; this may be implemented, without limitation, as described above in reference to FIGS. 1-6.

With continued reference to FIG. 7, method 700 may include a step of generating, by the computing device, an output as a function of a large language model. This may be implemented, without limitation, as described above in reference to FIGS. 1-6. In some embodiments, generating the output as a function of the large language model may include training the large language model using a plurality of training sets. In some embodiments, the plurality of training sets may include a plurality of textual works. In some embodiments, the output may include a dietary practice. In some embodiments, the output may include a phrase suggesting the dietary practice to the user. In some embodiments, the output may include a textual output. In some embodiments, the plurality of training sets may include dietary practices correlated to alleviation of disease states.

With continued reference to FIG. 7, in some embodiments, method 700 may include a step of receiving, by the computing device, an input from a user. This may be implemented, without limitation, as described above in reference to FIGS. 1-6. In some embodiments, the step of generating the output may include generating the output as a function of the large language model and the input. In some embodiments, the input may include a query. In some embodiments, the input may include a set of symptoms.

With continued reference to FIG. 7, in some embodiments, method 700 may include a step of validating, by the computing device, expert correlations in expert database. Validating the expert correlations may include comparing the correlation between the dietary practice and alleviation of the disease state to expert correlations in an expert database. Validating the expert correlations may include calculating a database reliability score as a function of the comparison between the correlation between the dietary practice and alleviation of the disease state.

Figure 8:
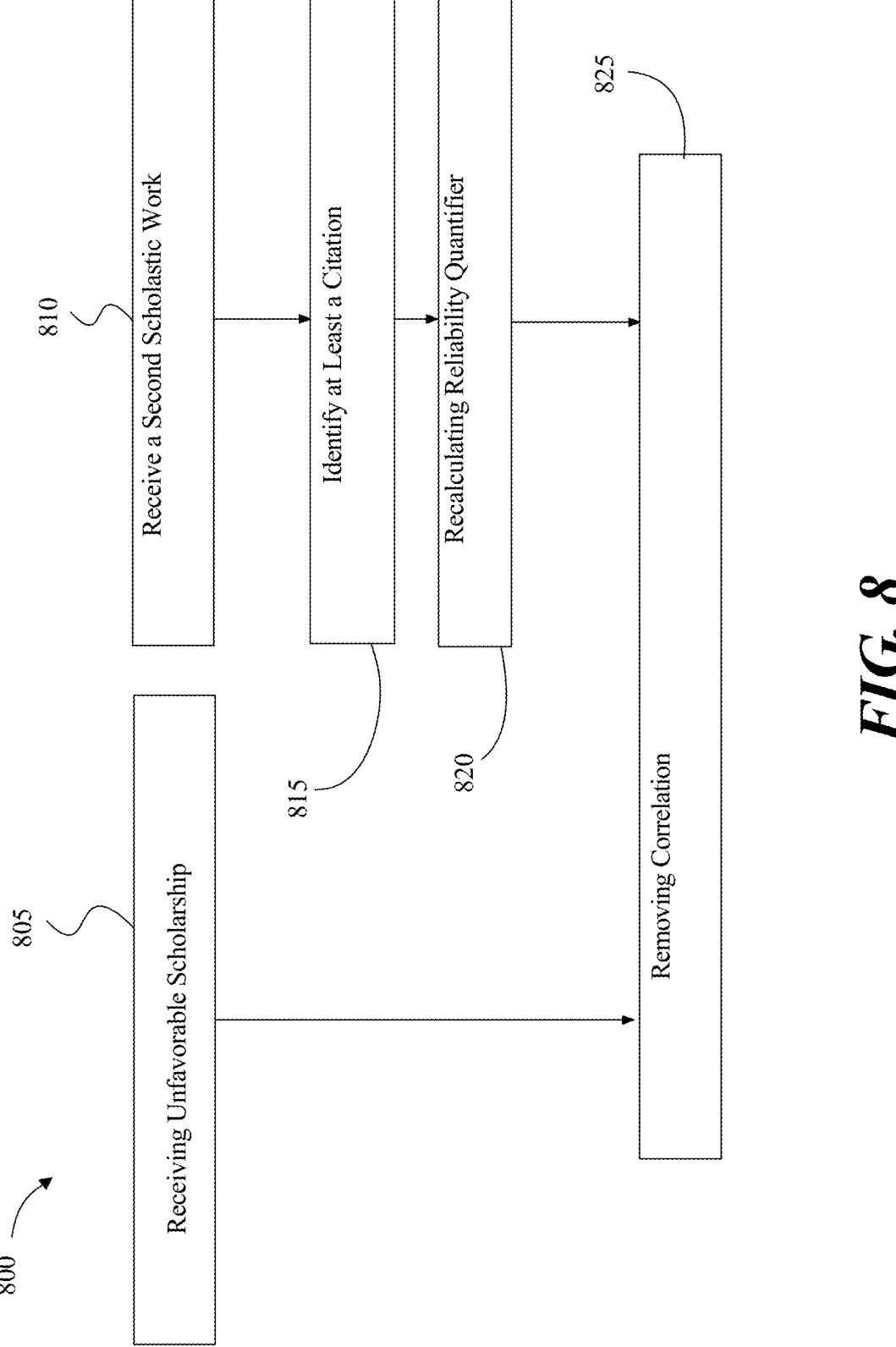
FIG. 8 is a flow diagram illustrating an exemplary embodiment of a method of modifying an expert database.

Referring now to FIG. 8, an exemplary embodiment of a method 800 of modifying an expert database is illustrated. At step 805, Computing device 104 may receive unfavorable scholarship regarding the first textual work 108. In some embodiments, this may include receiving a retraction of first textual work 108. At step 810 computing device 104 may receive a second textual work 108. At step 815, computing device 104 may identify at least a citation of first textual work 108 in the second textual work 108. At step 820, computing device 104 may recalculate reliability quantifier 132 and/or quantifiers as a function of the at least a citation. As disclosed with respect to FIGS. 1-6, recalculating the reliability quantifier 132 may include recalculating the expert prestige factor. At step 825, computing device 104 may remove at least a correlation from expert database as a function of the reliability quantifier 132, for instance as recalculated. For instance, correlations may be tagged with identifier of a textual work 108 from which they were derived, and thus may be removed where textual work 108 has been disqualified.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
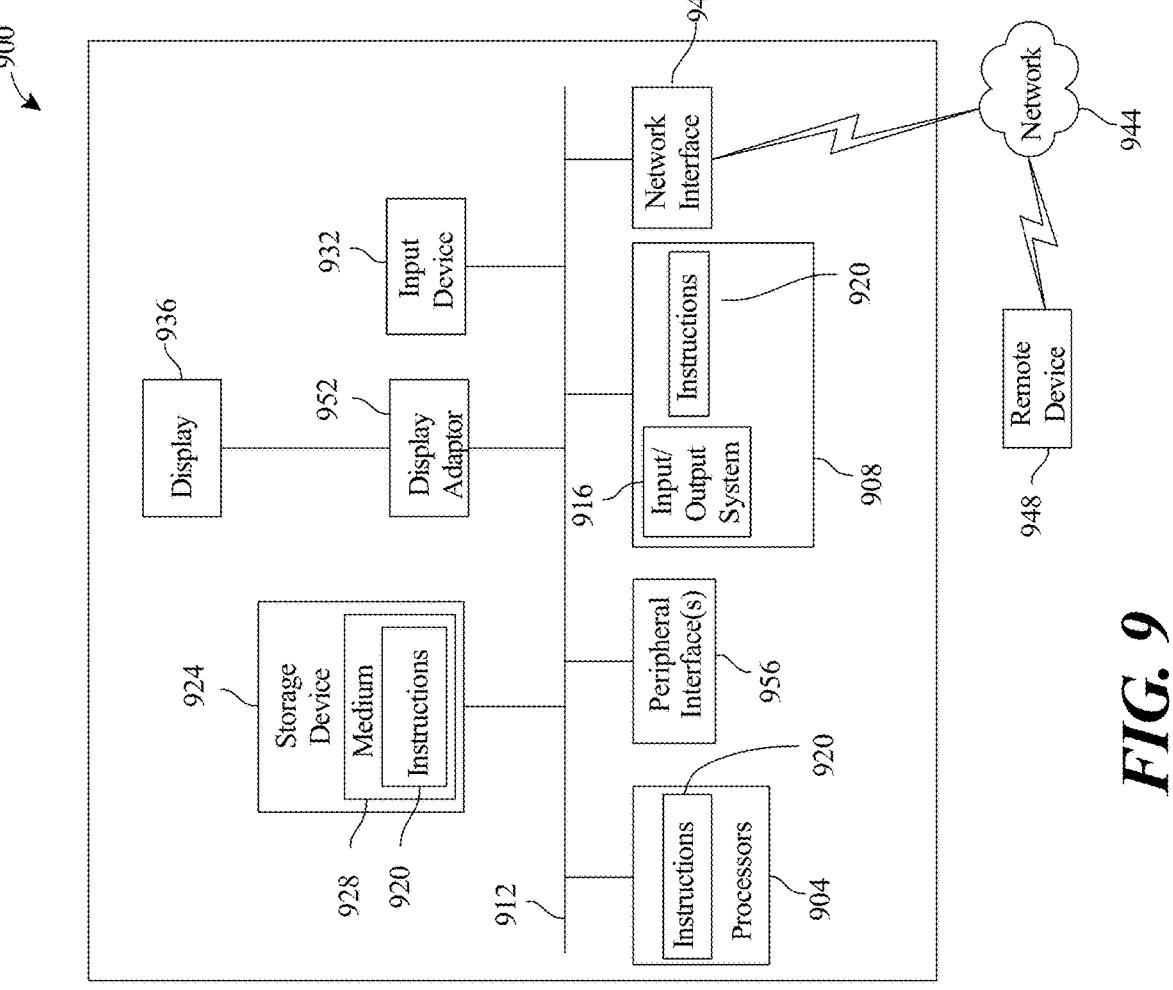
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for classification of textual works, the system comprising a computing device, wherein the computing device is configured to:

receive a first textual work comprising a plurality of textual elements;

identify an author and a category of the first textual work;

determine at least a work theme using a theme classifier as a function of the plurality of textual elements;

calculate a reliability quantifier as a function of the at least a work theme, the author, and the category;

select the textual work as a function of the reliability quantifier; and derive, from the textual work, at least a correlation between a dietary practice and alleviation of a disease state.

2. The system of claim 1, wherein the computing device is further configured to generate an output as a function of a large language model, wherein generating the output as a function of the large language model comprises training the large language model using a plurality of training sets, wherein the plurality of training sets comprises a plurality of textual works.

3. The system of claim 2, wherein the output comprises a dietary practice.

4. The system of claim 3, wherein the output further comprises a phrase suggesting the dietary practice to a user.

5. The system of claim 2, wherein the output comprises a textual output.

6. The system of claim 2, wherein:

the computing device is further configured to receive an input from a user; and generating the output as a function of the large language model comprises generating the output as a function of the large language model and the input.

7. The system of claim 6, wherein the input comprises a query.

8. The system of claim 6, wherein the input comprises a set of symptoms.

9. The system of claim 2, wherein the plurality of training sets comprises dietary practices correlated to alleviation of disease states.

10. The system of claim 1, wherein the computing device is further configured to validate expert correlations in expert database, wherein validating the expert correlations comprises:

comparing the correlation between the dietary practice and alleviation of the disease state to expert correlations in an expert database; and calculating a database reliability score as a function of the comparison between the correlation between the dietary practice and alleviation of the disease state.

11. A method for classification of textual works, the method comprising:

receiving, by a computing device, a first textual work comprising a plurality of textual elements;

identifying, by the computing device, an author and a category of the first textual work;

determining, by the computing device, at least a work theme using a theme classifier as a function of the plurality of textual elements;

calculating, by the computing device, a reliability quantifier as a function of the at least a work theme, the author, and the category;

selecting, by the computing device, the textual work as a function of the reliability quantifier; and deriving, by the computing device from a scholastic work, at least a correlation between a dietary practice and alleviation of a disease state.

12. The method of claim 11, further comprising generating, by the computing device, an output as a function of a large language model, wherein generating the output as a function of the large language model comprises training the large language model using a plurality of training sets, wherein the plurality of training sets comprises a plurality of textual works.

13. The method of claim 12, wherein the output comprises a dietary practice.

14. The method of claim 13, wherein the output further comprises a phrase suggesting the dietary practice to a user.

15. The method of claim 12, wherein the output comprises a textual output.

16. The method of claim 12, further comprising receiving, by the computing device, an input from a user; and wherein generating the output as a function of the large language model comprises generating the output as a function of the large language model and the input.

17. The method of claim 16, wherein the input comprises a query.

18. The method of claim 16, wherein the input comprises a set of symptoms.

19. The method of claim 12, wherein the plurality of training sets comprises dietary practices correlated to alleviation of disease states.

20. The method of claim 11, further comprising validating, by the computing device, expert correlations in expert database, wherein validating the expert correlations comprises:

comparing the correlation between the dietary practice and alleviation of the disease state to expert correlations in an expert database; and calculating a database reliability score as a function of the comparison between the correlation between the dietary practice and alleviation of the disease state.

\* \* \* \* \*